US012617915B2

(12) United States Patent
Xu

(10) Patent No.: US 12,617,915 B2
(45) Date of Patent: May 5, 2026

(54) FOAMABLE SILICONE COMPOSITION AND THE USE THEREOF

(71) Applicant: Wacker Chemie AG, Munich (DE)

(72) Inventor: Yuanyuan Xu, Shanghai (CN)

(73) Assignee: Wacker Chemie AG, Munich (DE)

( * ) Notice: Subject to any disclaimer, the term of this patent is extended or adjusted under 35 U.S.C. 154(b) by 538 days.

(21) Appl. No.: 18/272,109

(22) PCT Filed: Feb. 3, 2021

(86) PCT No.: PCT/CN2021/074968
§ 371 (c)(1),
(2) Date: Jul. 13, 2023

(87) PCT Pub. No.: WO2022/165655
PCT Pub. Date: Aug. 11, 2022

(65) Prior Publication Data
US 2023/0407031 A1      Dec. 21, 2023

(51) Int. Cl.
*C08J 9/02* (2006.01)
*C08G 77/04* (2006.01)
*C08G 77/08* (2006.01)
*C08G 77/12* (2006.01)
*C08G 77/16* (2006.01)
*C08G 77/20* (2006.01)
*C08J 9/00* (2006.01)
*C08J 9/12* (2006.01)
*C08G 101/00* (2006.01)

(52) U.S. Cl.
CPC ............ *C08J 9/0061* (2013.01); *C08G 77/08* (2013.01); *C08G 77/12* (2013.01); *C08G 77/16* (2013.01); *C08G 77/20* (2013.01); *C08J 9/02* (2013.01); *C08J 9/125* (2013.01); *C08G 2101/00* (2013.01); *C08G 2110/005* (2021.01); *C08J 2203/10* (2013.01); *C08J 2383/05* (2013.01); *C08J 2383/06* (2013.01); *C08J 2383/07* (2013.01)

(58) Field of Classification Search
CPC ... C08J 9/0061; C08J 9/02; C08J 9/125; C08J 2203/10; C08J 2383/05; C08J 2383/06; C08J 2383/07; C08G 77/08; C08G 77/12; C08G 77/16; C08G 77/20; C08G 2101/00; C08G 2110/005; C08L 83/04; C08L 83/00; C08K 5/56
See application file for complete search history.

(56) References Cited

U.S. PATENT DOCUMENTS

| | | | |
|---|---|---|---|
| 4,189,545 A | 2/1980 | Modic | |
| 4,599,367 A | 7/1986 | Bauman et al. | |
| 4,760,098 A | 7/1988 | Miutel | |
| 4,762,859 A | 8/1988 | Modic et al. | |
| 4,954,533 A | 9/1990 | Modic et al. | |
| 2004/0259965 A1 | 12/2004 | Higuchi et al. | |
| 2014/0024731 A1 * | 1/2014 | Blanc ........................ | C08J 9/02 521/86 |

FOREIGN PATENT DOCUMENTS

| | | |
|---|---|---|
| CN | 103665891 A | 3/2014 |
| CN | 106589954 A | 4/2017 |
| JP | 2006077262 A | 3/2006 |

\* cited by examiner

*Primary Examiner* — K. Boyle

(57) ABSTRACT

A foamable silicone composition, includes: (a) at least one organopolysiloxane containing at least two alkenyl groups bonded to silicon atoms per molecule, (b) at least one organopolysiloxane containing at least two hydrogen atoms bonded to silicon atoms per molecule, (c) porogenic agents generating gaseous hydrogen in the presence of component (b) comprising (c1) an organopolysiloxane containing at least one hydroxyl group bonded to silicon atom per molecule and (c2) water, and (d) hydrosilylation catalyst; with the proviso that the ratio of the number of moles of hydroxyl groups provided by component (c2) to that provided by component (c1) is within a range of from 1:5 to 20:1. The composition has a low viscosity and a relatively high pot life, and the foam cured therefrom has a low density, uniform porosity and fine cell structure.

12 Claims, No Drawings

FOAMABLE SILICONE COMPOSITION AND THE USE THEREOF

FIELD OF INVENTION

The present disclosure relates to a foamable silicone composition and the use thereof.

BACKGROUND OF INVENTION

Among the incidents of new energy vehicles, fires or explosions caused by lithium-ion batteries have become a major safety concern. One way to reduce or even eliminate such incidents is to use liquid silicone rubbers as potting materials for batteries to improve heat conduction or dissipation so as to protect from fire or explosion. However, liquid silicone rubbers usually have a relatively large specific gravity. Using them as potting materials will increase the weight of battery pack, reducing the specific energy per unit volume, and ultimately affecting the energy density.

Liquid foamable silicone rubbers have advantages in reducing the weight of battery pack. However, very few literatures report their application in battery potting. U.S. Pat. No. 4,760,098B describes a viscous liquid composition comprising A-part and B-part wherein the A part is consisting essentially of vinyl terminated siloxane, reactive diluent hydroxyl terminated siloxane, water and catalyst, and B part is consisting essentially of hydrogen siloxane and filler. The viscosity of A-part is from about 30,000 to about 65,000 cps at 32-34° C. and the addition of the B-part makes no significant difference to the viscosity of the foamable mixture. Such viscous liquid composition is not suitable for battery potting. CN106589954A discloses a low-viscosity, flame-retardant, and room temperature-curable silicone composition, comprising α, ω-dihydroxy polydimethylsiloxane with a viscosity of 300 to 5,000 mPa·s as a primary polymer, hydrogen-containing silicone oil and hydroxyl-terminated silicone oil with a viscosity of 60 to 150 mPa·s as a porogenic agent, which cures to a foam with a density of 0.58 to 0.68 g/cm³, and can be used for potting protection of new energy battery modules. A planetary mixer is needed in order to obtain such a foam with desirable characteristics, nevertheless, there still have difficulties in obtaining a foam with uniform porosity and cost for producing such foam is high.

U.S. Pat. No. 4,189,545A discloses a composition of another silicone rubber foam comprising vinylpolydimethylsiloxane with a viscosity of 380 cps as a primary polymer, hydrogen-containing silicone oil and water as a porogenic agent in Example 4. Such composition has a short pot life of 45 s and the water is not compatible with siloxanes.

Potting materials for batteries are generally required to have a low viscosity due to the requirement of fluidity, and a relatively long pot life facilitating the operation of potting. But preparation of a silicone foam with a low density and uniform porosity from a foamable composition having a relatively low viscosity and long pot life is and has always been a challenge in the art. A low viscosity usually means that bubbles formed from the reaction of Si—H and hydroxyl groups are easy to escape from the foamable composition. A relatively long pot life usually means the reaction between Si—H groups and alkenyl groups starts too slowly to form a network structure to capture the bubbles generated by foaming reaction. As a result, a foam with a higher density is obtained.

SUMMARY OF INVENTION

In view of the existing problems, the present disclosure provides a foamable silicone composition by using a given ratio of water and silanol as the porogenic agent, well solving the contradiction between the relatively low viscosity and long pot life of the foamable composition and the relatively low density of the derived foam.

The first aspect of the present disclosure provides a foamable silicone composition, comprising:

(a) at least one organopolysiloxane containing at least two alkenyl groups bonded to silicon atoms per molecule, (b) at least one organopolysiloxane containing at least two hydrogen atoms bonded to silicon atoms per molecule, (c) porogenic agents generating gaseous hydrogen in the presence of component (b), comprising (c1) an organopolysiloxane containing at least one hydroxyl group bonded to silicon atom per molecule, and (c2) water, and (d) hydrosilylation catalyst;

with the proviso that the ratio of the number of moles of hydroxyl groups provided by component (c2) to that provided by component (c1) is within a range of from 1:5 to 20:1.

Component (a)

The organopolysiloxane (a) as a base polymer is well known. Suitable alkenyl groups bonded to silicon atoms contain from 2 to 6 carbon atoms, for example vinyl, allyl, propenyl, butenyl, hexenyl, preferably vinyl, allyl and propenyl, more preferably vinyl. Organic groups bonded to remaining silicon atoms of organopolysiloxane (a) are each independently selected from monovalent organic groups free of aliphatic unsaturation having from 1 to 20 preferably 1 to 10 carbon atoms, for example, alkyl such as methyl, ethyl, propyl, butyl, pentyl, hexyl, octyl, aryl or alkaryl such as phenyl, tolyl, xylyl, mesityl, ethylphenyl, benzyl, naphthyl, and halogenated or organic-group-functionalized derivatives of the above groups such as 3,3,3-trifluoropropyl, o-, p- and m-chlorophenyl, aminopropyl, 3-isocyanatopropyl, cyanoethyl, preferably methyl and phenyl, more preferably methyl.

The organopolysiloxane (a) is typically linear. Some exemplary polyorganosiloxanes (a) can be described by the formula as follows:

$$R^1R^2{}_2SiO(R^2{}_2SiO)_m(R^1R^2SiO)_nSiR^2{}_2R^1$$

wherein $R^1$ is independently at each occurrence an alkenyl group having from 2 to 6 carbon atoms, which is exemplified as above;

$R^2$ is independently at each occurrence a monovalent organic group especially monovalent hydrocarbon group free of aliphatic unsaturation having from 1 to 20 preferably 1 to 10 carbon atoms, which is exemplified as above;

m is a positive number, n is zero or a positive number, and m+n is such that the organopolysiloxane (a) has a dynamic viscosity at 25° C. of from 10 to 5,000 mPa·s, for example from 50 to 2,000 mPa·s.

The organopolysiloxane (a) of the present disclosure may be a single alkenyl-containing organopolysiloxane, or may be a mixture of different alkenyl-containing organopolysiloxanes which differ in molecular structure (for example type and number of substituents), or viscosity. For a mixture of organopolysiloxanes, m+n represents an average value, and the viscosity range met by m+n is relative to the viscosity of the mixture.

Generally, foamable silicone compositions used as potting materials are required to have a lower viscosity, and correspondingly the viscosity of alkenyl-containing organopolysiloxane is usually low. In an embodiment herein, component (a) comprises (a1) a first organopolysiloxane containing at least two alkenyl groups bonded to silicon atoms per molecule with a dynamic viscosity at 25° C. of from 10 to 1,000 mPa·s, for example from 100 to 500 mPa·s, and (a2) a second organopolysiloxane containing at least two alkenyl groups bonded to silicon atoms per molecule with a dynamic viscosity at 25° C. of from 1,000 to 50,000 mPa·s, for example from 5,000 to mPa·s. According to the above embodiment, component (a) preferably comprises greater than or equal to 80 wt % of component (a1) based on the total weight of component (a).

Component (a) may further comprise branched or resinous polyorganosiloxanes containing trifunctional units such as $R^1SiO_{3/2}$ and $R^2SiO_{3/2}$, and/or tetrafunctional units such as $SiO_{4/2}$, wherein $R^1$ and $R^2$ are as defined above, to improve the foam hardness and increase crosslinking sites. In an embodiment herein, component (a) comprises an organopolysiloxane consisting essentially of $R^1R^2_2SiO_{1/2}$ and $SiO_{4/2}$ units, wherein $R^1$ and $R^2$ are as defined above. Herein "essentially" means that the polyorganosiloxane contains at least 80 mol %, for example at least 90 mol %, even at least 95 mol % of the units listed above.

In the present disclosure, component (a) is suitably used in an amount of from 20 wt % to 80 wt %, for example from 30 wt % to 70 wt %, based on the total weight of the composition.

Component (b)

The organopolysiloxane (b) may be linear, cyclic, branched or resinous. Linear or cyclic polyorganosiloxane (b) is typically composed of units selected from $R^2_3SiO_{1/2}$, $HR^2SiO_{2/2}$, $HR^2_2SiO_{1/2}$ and $R^2_2SiO_{2/2}$, wherein $R^2$ is as defined above. Branched or resinous polyorganosiloxane (b) further comprises trifunctional units such as $HSiO_{3/2}$ and $R^2SiO_{3/2}$, and/or tetrafunctional units such as $SiO_{4/2}$, wherein $R^2$ is as defined above.

The organopolysiloxane (b) as a crosslinker is well known in the art, typically having at least 3 hydrogen atoms bonded to silicon atoms. The organopolysiloxane as a crosslinker preferably has a hydrogen content of from 1.2 wt % to 1.7 wt % so as to well balance two competing reactions, i.e. the curing reaction between Si—H groups and alkenyl groups and the foaming reaction between Si—H groups and hydroxyl groups.

The component (b) of the present disclosure may further comprise those organopolysiloxanes as a chain extender containing two hydrogen atoms bonded to silicon atoms at both ends of the chain per molecule, which typically can be described by formula of $HR^2_2SiO(R^2_2SiO)_wSiR^2_2H$, wherein $R^2$ is as defined above and w is a positive number. The organopolysiloxane as a chain extender suitably has a dynamic viscosity at 25° C. of from 10 to 2,000 mPa·s, especially from 50 to 2,000 mPa·s. The chain extender may be a single hydrogen-terminated organopolysiloxane, or may be a mixture of different hydrogen-terminated organopolysiloxanes. For a mixture, the aforesaid viscosity range refers to the overall viscosity of the mixture. It shall be understood that the organopolysiloxane (b) as a crosslinker is different from the organopolysiloxane (b) as a chain extender.

In an embodiment herein, wherein component (b) comprises: (b1) an organopolysiloxane containing at least three hydrogen atoms bonded to silicon atoms per molecule, and (b2) an organopolysiloxane containing two hydrogen atoms bonded to silicon atoms at both ends of the chain per molecule. According to the above embodiment, component (b1) preferably has a hydrogen content of from 1.2 wt % to 1.7 wt %, component (b2) comprises preferably greater than or equal to 80 wt % of organopolysiloxanes containing two hydrogen atoms bonded to silicon atoms at both ends of the chain per molecule with a dynamic viscosity at 25° C. of from 10 to 2,000 mPa·s, for example from 50 to 2,000 mPa·s especially from 500 to 2,000 mPa·s, based on the total weight of component (b2).

In the present disclosure, the ratio of the number of moles of Si—H groups provided by component (b) to that of silicon-bonded alkenyl groups provided by component (a) is preferably from 2:1 to 15:1, for example from 2:1 to 12:1, especially from 2:1 to 8:1

Component (b) is suitably used in an amount of from 20 wt % to 70 wt %, for example from 30 wt % to 60 wt %, based on the total weight of the composition.

Component (c)

Component (c) is used as a porogenic agent, which reacts with Si—H groups from component (b) generating gaseous hydrogen to influence foaming behaviour but does no contribution to crosslinking. The ratio of the number of moles of hydroxyl groups provided by component (c2) to that provided by component (c1) is preferably within a range of from 1:2 to 10:1, for example from 1:1 to 8:1, especially from 2:1 to 6:1.

Some exemplary polyorganosiloxanes (c1) can be described by the formula as follows:

$$R^3R^2_2SiO(R^2_2SiO)_p(R^3R^2SiO)_qSiR^2_2R^3$$

wherein $R^2$ is as defined above;

$R^3$ is independently at each occurrence a hydroxyl group or $R^2$, and it suffices that at least one $R^3$ is a hydroxyl group, preferably both $R^3$ bonded to the end silicon atoms of the chain are hydroxyl groups;

p is a positive number, q is zero or a positive number, and p+q is such that the organopolysiloxane (c1) has a dynamic viscosity at 25° C. of from 10 to 1,000 mPa·s, for example from 50 to 500 mPa·s.

Organopolysiloxane (c1) of the following formula is particularly preferred: $HO(Me_2SiO)_p(HOMeSiO)_qOH$, wherein p and q are as defined above.

The water (c2) is preferably introduced in the form of an aqueous emulsion, such as an aqueous silicone emulsion including an oil-in-water silicone emulsion or a water-in-oil silicone reverse emulsion, to promote the dispersion of water in the composition. The aqueous silicone emulsion contains a polysiloxane oil phase, a water phase and an emulsifier. The emulsifier may be a nonionic emulsifier, an anionic surfactant, a cationic surfactant or a zwitterionic surfactant, preferably a nonionic surfactant. The aqueous silicone emulsion can be obtained by an emulsification process well known to those skilled in the art. The viscosity of the aqueous silicone emulsion is not particularly limited. In a preferred embodiment herein, component (c2) is an aqueous emulsion of polysiloxane with a dynamic viscosity of from 1,000 to 30,000 mPa·s at 25° C.

Component (c) may further comprise a certain amount of alkanol, which may be an organic alcohol containing at least one hydroxyl group, but is not an alcohol acting as a hydrosilylation inhibitor for example alkynol, including monohydric alcohols with 1 to 12 carbon atoms such as ethanol, n-propanol, and isopropanol, n-butanol, n-hexanol, n-octanol, cyclopentanol, cyclohexanol, cycloheptanol, polyols with 2 to 12 carbon atoms such as ethylene glycol, propylene glycol, glycerin, butylene glycol, pentanol glycol, heptandiol. In a preferred embodiment herein, component (c) is free of alkanol.

In the present disclosure, component (c) is suitably used in an amount of less than or equal to 15 wt % based on the total weight of the composition. Component (c1) is preferably in an amount of from 1 wt % to 15 wt %, for example from 2 wt % to 10 wt %; component (c2) is preferably in an amount of from 0.01 wt % to 1 wt %, for example from 0.05 wt % to 0.5 wt %, based on the total weight of the composition.

The ratio of the number of moles of Si—H groups provided by component (b) to that of hydroxyl groups provided by component (c) is preferably from 1:2 to 15:1, for example from 2:1 to 12:1, especially from 2:1 to 8:1.

Component (d)

Component (d) can be a variety of hydrosilylation catalysts used in the prior arts for addition-curing silicone compositions, preferably a platinum-based catalyst, for example chloroplatinic acid, chloroplatinates, olefin complexes of platinum, and alkenylsiloxane complexes of platinum. The platinum-based catalyst can be used in an amount subject to the desired curing rate and economic consideration, which is usually a minimum level required to ensure an effective hydrosilylation reaction. Generally, the weight of platinum metal in the foamable silicone composition is from 0.1 to 1,000 ppm, for example from 1 to 200 ppm.

Component (e)

The foamable silicone composition may further comprise inhibitor (e) to control the pot life and curing rate of the composition. The inhibitor can be a variety of inhibitors used in the art, for example alkynol such as 1-ethynyl-1-cyclohexanol, 2-methyl-3-butyn-2-ol; polymethylvinylcyclosiloxanes, such as 1,3,5,7-tetravinyltetramethyltetracyclo-siloxane, alkyl maleate. The amount of the inhibitor can be selected according to its chemical structure and the desired curing rate. Generally, the weight of inhibitor in the composition is from 1 to 50,000 ppm, for example from 10 to 10,000 ppm.

Other Optical Components

The siloxane composition may further comprise an appropriate amount of other components, for example fillers (f), diluents (g), color pastes (h), as long as such components do not impair the effects of the present invention.

Examples of fillers (f) are calcium carbonate, silica, silica fine powder, diatomaceous earth, organic montmorillonite, titanium dioxide, but are not limited thereto. And silica is particularly preferred. The silica includes fumed silica, precipitated silica, and mixtures thereof. The specific surface area of the silica is suitably at least 50 m$^2$/g, preferably in the range from 100 to 400 m$^2$/g, for example from 150 to 350 m$^2$/g, as determined by BET method. The silica can either be hydrophilic or hydrophobic.

Examples of diluents (g) to be mentioned are dimethyl silicone oils having a dynamic viscosity of from 10 to 5,000 mPa·s at 25° C., MDT silicone oils having a dynamic viscosity of from 15 to 300 mPa·s at 25° C., mineral oils having a kinematic viscosity of from 10 to 100 mm$^2$/s at 25° C. Generally, the addition of diluents could lower the viscosity of the composition and change the rheological properties thereof. Nevertheless, in view of the potential bleeding issue, the foamable silicone composition of the present disclosure is preferably free of diluents.

In a preferred embodiment, the foamable silicone composition comprises:

(a) 20~80 wt % of at least one organopolysiloxane containing at least two alkenyl groups bonded to silicon atoms per molecule, (b1) 1~8 wt % of an organopolysiloxane containing at least three hydrogen atoms bonded to silicon atoms per molecule, (b2) 20~70 wt % of an organopolysiloxane containing two hydrogen atoms bonded to silicon atoms at both ends of the chain per molecule.

(c1) 1~15 wt % of an organopolysiloxane containing at least one hydroxyl group bonded to silicon atom per molecule, (c2) 0.01~1 wt % of water, and (d) hydrosilylation catalyst.

Preferably the foamable silicone composition of the present disclosure is stored as two or more separate packages where components (b) and (c) are not stored in the same package and components (a), (b) and (d) are not stored in the same package.

The foamable silicone composition of the present disclosure has a viscosity of suitably from 200 to 10,000 mPas, for example from 500 to 5,000 mPa, especially from 500 to 2,000 mPa·s at room temperature (23±2°) C. The viscosity herein refers to a mixed viscosity of the composition before curing. When the composition is stored in two or more separate packages, the viscosity also refers to the viscosity of each package. Generally, the higher the viscosity of the composition is, the lower density of the obtained foam tends to be. It is technically challenging to form a foam with a lower density from the composition with a low viscosity.

The second aspect of the present disclosure provides a foam cured from the foamable silicone composition of the first aspect of the present disclosure.

It is obtained by crosslinking or curing the composition described in the first aspect of the present disclosure, or mixing the separate packages as described above followed by crosslinking or curing.

Generally, the crosslinking or curing is carried out at a temperature of 15~180° C. for 10 min~72 h. A lower curing temperature and a short curing time are desired. Considering that the curing and foaming reactions occur simultaneously and both are very sensitive to temperature, preference is given to curing at a temperature of 20~80° C. for 15~60 min, for example curing at room temperature for 60 min. Herein the "room temperature", unless specified, refers to (23±2°) C.

The foam of the present disclosure has a density of from 0.3 to 0.6 g/cm$^3$ and a closed cell ratio of greater than 90%. The determination of the foam density is carried out according to standard GB/T 6343-2009 Cellular plastics and rubbers—Determination of apparent density. The determination of the closed cell ratio is carried out according to standard GB/T 10799-2008 Rigid cellular plastics—Determination of the volume percentage of open cells and of closed cells.

The third aspect of the present disclosure provides use of the foamable silicone composition of the first aspect of the present disclosure as a potting material, especially for batteries.

The foamable silicone composition of the present disclosure has a low viscosity, good fluidity and relatively long pot life, which facilitates the operation for potting. The obtained foam is excellent in high and low temperature resistance, weather resistance and electrical insulation, and can effectively protect batteries during working and help dissipate heat of batteries in time. Besides, the existence of cells can further insulate heat and improve the safety and service life of batteries. Moreover, the foam of the present disclosure has a relatively low density, which effectively solves the decreasion in energy density of the battery pack caused by conventional pourable silicone rubbers with a large specific gravity.

Herein the "viscosity", unless specified, is measured according to conventional methods in the art.

DETAILED DESCRIPTION OF THE PREFERRED EMBODIMENT

The present invention is further illustrated by the following examples, but is not limited to the scope thereof. Any experimental methods with no conditions specified in the following examples are selected according to the conventional methods and conditions, or product specifications.

Determination of Viscosity

The viscosities of components A and B were measured by Brookfield viscometer using No. 2 spindle at a speed of 10 rpm at room temperature (23±2) ° C.

Determination of Pot Life

Pot life refers to the window of time that the mixture of components A and B is able to be used once they are mixed. The wording "able to be used" means such a state that the mixture of components A and B is still a slurry with good fluidity and has not begun to solidify. The pot life of the present disclosure was determined at (23±2°) C. and 50±10% relative humidity.

Determination of Foam Density

It was conducted according to standard GB/T 6343-2009.

Porosity Condition

Cross-section of the foam was visually observed with regard to uniformity of pores across the entire cross-sectional areas. When existence of localized excessively large pores or nonexistence of localized pores was observed in the cross section, uniformity of pores was evaluated as "inhomogeneous". When there was no such excessively large pores and pores were uniformly found in the cross-section, uniformity of pores was evaluated as "uniform".

Cell Size

The central portion of the cross-section of the foam was observed under an electron microscope. When more than or equal to 90% of the cells were observed to have a maximum diameter of less than or equal to 1 mm, the size of cells was evaluated as a "fine cell", otherwise it was evaluated as a "coarse cell".

Details of the raw materials used in the Examples and Comparative Examples are as follows.

a1: dimethylvinylsiloxy-terminated polydimethylsiloxane, with a dynamic viscosity of about 20,000 mPa·s at 25° C. and a vinyl content of 0.042 mmol/g, supplied by Wacker Chemicals.

a2: dimethylvinylsiloxy-terminated polydimethylsiloxane, with a dynamic viscosity of about 500 mPa·s at 25° C. and a vinyl content of 0.17 mmol/g, supplied by Wacker Chemicals.

a3: dimethylvinylsiloxy-terminated polydimethylsiloxane, with a dynamic viscosity of about 200 mPa·s at 25° C. and a vinyl content of 0.26 mmol/g, supplied by Wacker Chemicals.

a4: polydimethylsiloxane having multiple vinyls, with a dynamic viscosity of mPa·s at 25° C. and a vinyl content of 0.24 mmol/g, supplied by Wacker Chemicals.

b1: polydimethylsiloxane having multiple hydrogen atoms, with a dynamic viscosity of about 20 mPa·s at 25° C. and a hydrogen content of 16.3 mmol/g, supplied by Wacker Chemicals.

b2: dimethylhydrosiloxy-terminated polydimethylsiloxane, with a dynamic viscosity of about 1,000 mPa·s at 25° C. and a hydrogen content of 0.12 mmol/g, supplied by Wacker Chemicals.

c1: dimethylhydroxylsiloxy-terminated polydimethylsiloxane, with a hydroxyl content of 1.2 wt %, supplied by Wacker Chemicals.

c2: water-based emulsion of polydimethylsiloxane, with a dynamic viscosity of 5,000~10,000 mPa·s at 25° C. and a hydroxyl content of 59.9 wt %, supplied by Wacker Chemicals.

d: platinum-based catalyst, WACKER® CATALYST EP, supplied by Wacker Chemicals.

e: inhibitor, WACKER® INHIBITOR PT 88, supplied by Wacker Chemicals.

f: vinyl MQ resin, with a molar ratio of M units to Q units of 0.7:1 and a vinyl content of 0.78 mmol/g, supplied by Wacker Chemicals.

g: trimethylsiloxy-terminated polydimethylsiloxane with a dynamic viscosity of about 100 mPa·s at 25° C., supplied by Wacker Chemicals.

h: color paste, ELASTOSIL® COLOR PASTE FL BLACK RAL 9005 F, supplied by Wacker Chemicals.

Examples 1-3 and Comparative Examples 1-2

According to the formulas in Table 1, the ingredients in each Component A and Component B were mixed well respectively. Then Component A and B were mixed respectively and the obtained mixture was cured at room temperature for 60 min to give a silicone foam.

Table 2 shows pot life of the compositions, foam density, porosity condition and cell size of the foams obtained in each example and comparative example. Foams of Examples 1-3 have a low density, uniform porosity and fine cell structure by using water and hydroxy-terminated polydimethylsiloxane as the porogenic agent. Foam of Comparative Example 1 has a higher density by using hydroxy-terminated polydimethylsiloxane only as the porogenic agent. Foam of Comparative Example 2 has a higher density, inhomogeneous porosity and coarse cell structure by using water only as the porogenic agent.

TABLE 1

| | Ingredients (parts by weight) | Example 1 | Example 2 | Example 3 | Comparative Example 1 | Comparative Example 2 |
|---|---|---|---|---|---|---|
| Component A | a1 | 7.48 | 7.48 | 7.48 | 7.48 | 7.48 |
| | a2 | 70.00 | 70.00 | 70.00 | 70.00 | 70.00 |
| | a3 | 19.44 | 19.44 | 19.44 | 19.44 | 19.44 |
| | c1 | 6.95 | 5.99 | 8.21 | 33.00 | / |
| | c2 | 0.54 | 0.56 | 0.51 | / | 0.69 |
| | d | 0.40 | 0.40 | 0.40 | 0.40 | 0.40 |
| | f | 5.53 | 5.53 | 5.53 | 5.53 | 5.53 |
| | g | / | / | / | / | 6.80 |
| | viscosity (mPa · s) | 1,000 | 1,000 | 900 | 750 | 1,100 |

TABLE 1-continued

| | Ingredients (parts by weight) | Example 1 | Example 2 | Example 3 | Comparative Example 1 | Comparative Example 2 |
|---|---|---|---|---|---|---|
| Component | a4 | 11 | 11 | 11 | 11 | 11 |
| B | b1 | 6.78 | 6.78 | 6.78 | 6.78 | 6.78 |
| | b2 | 83.40 | 83.40 | 83.40 | 83.40 | 83.40 |
| | e | 0.1 | 0.1 | 0.1 | 0.1 | 0.1 |
| | h | 0.4 | 0.4 | 0.4 | 0.4 | 0.4 |
| | viscosity (mPa · s) | 1,000 | 1,000 | 1,000 | 1,000 | 1,000 |
| Si—H/Si—Vi* (molar ratio) | | 4.52 | 4.52 | 4.52 | 4.52 | 4.52 |
| Si—H/OH (molar ratio) | | 4.53 | 4.53 | 4.56 | 4.51 | 4.50 |
| OH from ingredient c2/ OH from ingredient c1 (molar ratio) | | 3.72 | 4.48 | 2.98 | / | / |

*Number of moles of Si—Vi is calculated based on the Si—Vi groups in ingredients a1-a4 and f.

TABLE 2

| | Example 1 | Example 2 | Example 3 | Comparative Example 1 | Comparative Example 2 |
|---|---|---|---|---|---|
| Pot life (s) | 120 | 120 | 120 | 120 | 140 |
| Foam density (g/cm³) | 0.55 | 0.55 | 0.55 | 0.70 | 0.65 |
| Porosity condition | uniform | uniform | uniform | uniform | inhomogeneous |
| Cell size | fine cell | fine cell | fine cell | fine cell | coarse cell |

What is claimed is:

1. A foamable silicone composition, comprising:

(a) at least one organopolysiloxane containing at least two alkenyl groups bonded to silicon atoms per molecule, (b) at least one organopolysiloxane containing at least two hydrogen atoms bonded to silicon atoms per molecule, comprising:

(b1) an organopolysiloxane containing at least three hydrogen atoms bonded to silicon atoms per molecule, and (b2) an organopolysiloxane containing two hydrogen atoms bonded to silicon atoms at both ends of the chain per molecule, (c) porogenic agents generating gaseous hydrogen in the presence of component (b), comprising (c1) an organopolysiloxane containing at least one hydroxyl group bonded to silicon atom per molecule, and (c2) water, and (d) hydrosilylation catalyst;

with the proviso that the ratio of the number of moles of hydroxyl groups provided by component (c2) to that provided by component (c1) is within a range of from 1:5 to 20:1, and the composition has a dynamic viscosity of from 200 to 10,000 mPa·s at (23±2°) C. before curing measured by Brookfield viscometer using No. 2 spindle at a speed of 10 rpm.

2. The composition of claim 1, wherein the ratio of the number of moles of hydroxyl groups provided by component (c2) to that provided by component (c1) is within a range of from 1:2 to 10:1.

3. The composition of claim 1, wherein component (c) is used in an amount of less than or equal to 15 wt % based on the total weight of the composition.

4. The composition of claim 1, wherein the ratio of the number of moles of Si—H groups provided by component (b) to that of silicon-bonded alkenyl groups provided by component (a) is from 2:1 to 15:1.

5. The composition of claim 1, wherein the ratio of the number of moles of Si—H groups provided by component (b) to that of hydroxyl groups provided by component (c) is from 1:2 to 15:1.

6. The composition of claim 1, wherein component (c1) has a dynamic viscosity of from 10 to 1,000 mPa·s at 25° C.

7. The composition of claim 1, wherein component (a) comprises greater than or equal to 80 wt % of organopolysiloxanes containing at least two alkenyl groups bonded to silicon atoms per molecule with a dynamic viscosity of from 10 to 1,000 mPa·s at 25° C. based on the total weight of component (a).

8. The composition of claim 1, wherein component (b1) has a hydrogen content of from 1.2 wt % to 1.7 wt %.

9. The composition of claim 1, wherein component (b2) comprises greater than or equal to 80 wt % of organopolysiloxanes containing two hydrogen atoms bonded to silicon atoms at both ends of the chain per molecule with a dynamic viscosity of from 10 to 2,000 mPa·s at 25° C. based on the total weight of component (b2).

10. The composition of claim 1, wherein the composition comprises:

(a) 20~80 wt % of at least one organopolysiloxane containing at least two alkenyl groups bonded to silicon atoms per molecule, (b1) 1~8 wt % of an organopolysiloxane containing at least three hydrogen atoms bonded to silicon atoms per molecule, (b2) 20~70 wt % of an organopolysiloxane containing two hydrogen atoms bonded to silicon atoms at both ends of the chain per molecule, (c1) 1~15 wt % of an organopolysiloxane containing at least one hydroxyl group bonded to silicon atom per molecule, (c2) 0.01~1 wt % of water, and (d) hydrosilylation catalyst.

11. A foam cured from the composition of claim 1.

12. A potting material comprising the composition of claim 1.

* * * * *